(12) United States Patent
Mitchell et al.

(10) Patent No.: US 11,005,565 B1
(45) Date of Patent: May 11, 2021

(54) FREE SPACE OPTICAL COMMUNICATION TERMINAL WITH WAVELENGTH DEPENDENT OPTIC

(71) Applicant: SA Photonics, Inc., Los Gatos, CA (US)

(72) Inventors: Greg G. Mitchell, Elk Grove, CA (US); Dmitry V. Bakin, San Jose, CA (US); David A. Pechner, San Jose, CA (US)

(73) Assignee: SA Photonics, Inc., Los Gatos, CA (US)

(*) Notice: Subject to any disclaimer, the term of this patent is extended or adjusted under 35 U.S.C. 154(b) by 0 days.

(21) Appl. No.: 16/887,819

(22) Filed: May 29, 2020

(51) Int. Cl.
*H04B 10/118* (2013.01)
*H04B 10/112* (2013.01)

(52) U.S. Cl.
CPC ....... *H04B 10/118* (2013.01); *H04B 10/1121* (2013.01); *H04B 10/1125* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,755,739 | B1 * | 9/2017 | Wang | H04B 10/11 |
| 2001/0035995 | A1 * | 11/2001 | Ruggiero | H04B 10/1121 398/118 |
| 2004/0004746 | A1 | 1/2004 | Riza | |
| 2011/0274434 | A1 * | 11/2011 | Cunningham | H04B 10/112 398/118 |
| 2014/0086588 | A1 * | 3/2014 | Kawanishi | H04B 1/3827 398/115 |
| 2015/0244458 | A1 * | 8/2015 | Erkmen | H04B 7/18504 398/122 |
| 2016/0043800 | A1 * | 2/2016 | Kingsbury | H04B 7/18517 398/125 |
| 2016/0087722 | A1 * | 3/2016 | Wabnig | H04B 10/1125 398/131 |
| 2016/0204865 | A1 * | 7/2016 | Boroson | H04B 10/1121 398/97 |
| 2020/0049989 | A1 * | 2/2020 | Brown | G06F 3/013 |

* cited by examiner

*Primary Examiner* — Omar S Ismail
(74) *Attorney, Agent, or Firm* — Fenwick & West LLP

(57) ABSTRACT

Embodiments relate to a free space optical (FSO) communication terminal. The terminal includes an optical source and optics. The optical source can produce optical beams at different wavelengths. The optics direct optical beams in a direction towards a remote FSO communication terminal. A wavelength dependence of the optics results in a divergence of the optical beam that depends on a wavelength of the optical beam. A controller may control the wavelength of the optical beam produced by the optical source, thereby adjusting the divergence of the optical beam (e.g., according to an acquisition process or a tracking process).

20 Claims, 9 Drawing Sheets

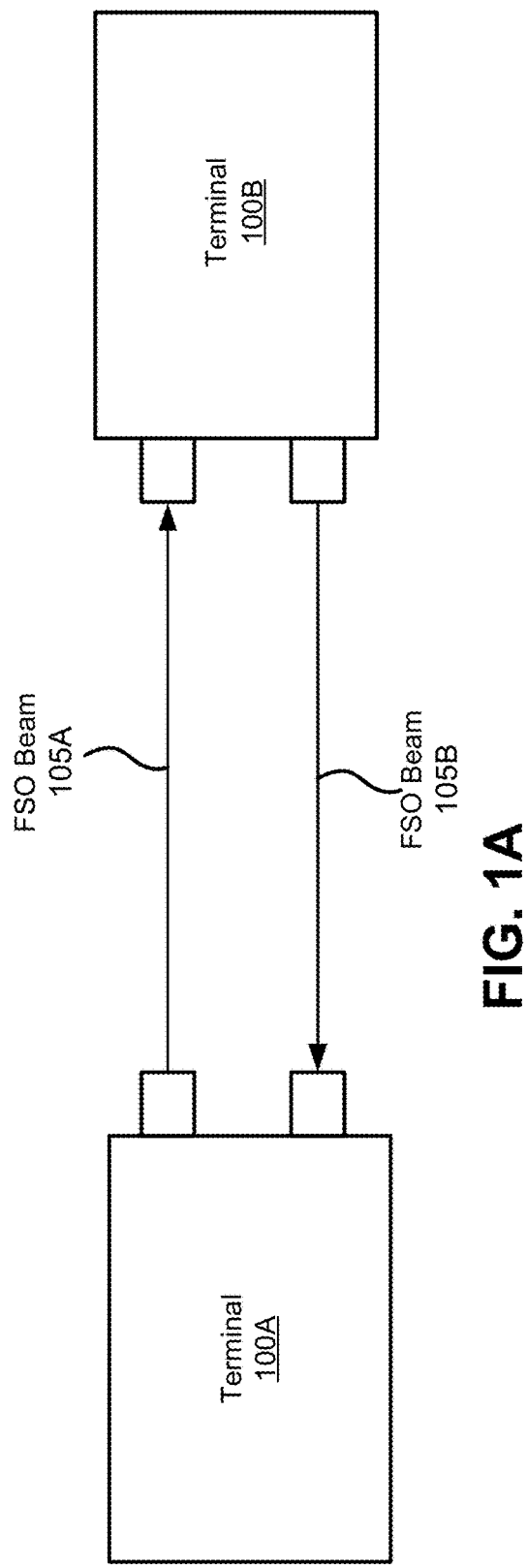
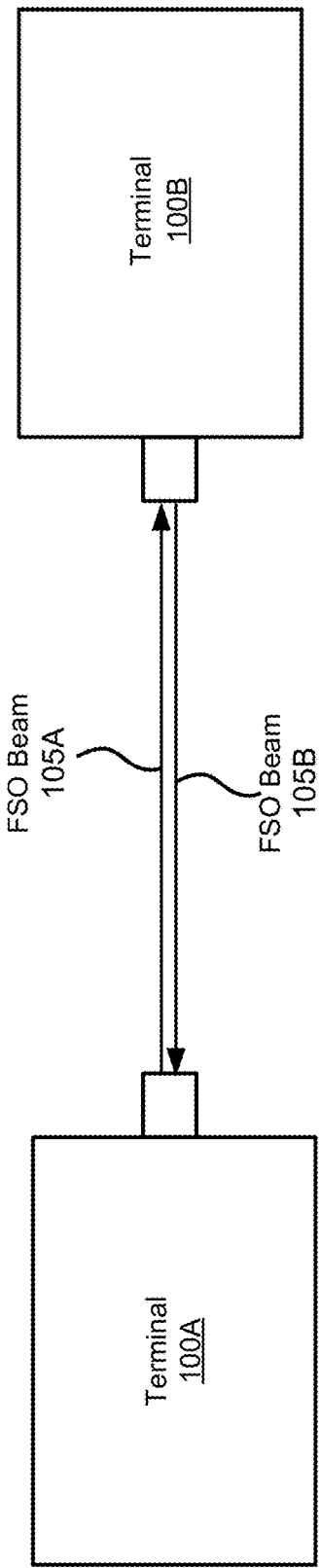
FIG. 1A
FIG. 1B

FREE SPACE OPTICAL COMMUNICATION TERMINAL WITH WAVELENGTH DEPENDENT OPTIC

STATEMENT REGARDING FEDERALLY SPONSORED RESEARCH OR DEVELOPMENT

This invention was made with government support under contract FA9453-19-C-0901 awarded by the United States Air Force. The government has certain rights in the invention.

BACKGROUND

1. Technical Field

This disclosure relates generally to free space optical (FSO) communications and, more particularly, to adjusting the beam divergence of an optical beam from the FSO terminal.

2. Description of Related Art

Free space optical (FSO) communications is a communications technology that uses light propagating in free space to wirelessly transmit data, for example, for telecommunications or computer networking. Free space is a communications medium that can include air, outer space, or vacuum and contrasts with guided wave communications, such as optical fibers. FSO technology is useful where physical connections are impractical due to high costs or other considerations. In contrast with other electromagnetic communications means, FSO signals are more directional ("FSO signals" refers to light propagating between terminals). The directionality confers benefits both for communications capacity and for communications privacy.

However, high directionality demands accurate beam pointing between terminals and renders communication unpredictable if the FSO beams miss their intended targets. For example, if an FSO terminal is mounted on a tower, strong winds may move the tower such that the FSO terminal sways with the tower. In another example, an FSO terminal is mounted on a flying vehicle that communicates with a stationary FSO terminal. In these and similar situations, high directionality may require rapid adjustment and accurate pointing to establish and maintain a reliable FSO communication link.

SUMMARY

Embodiments relate to a free space optical (FSO) communication terminal. The terminal includes an optical source and optics. The optical source can produce optical beams at different wavelengths. For example, the optical source produces a beacon beam (e.g., during a beam acquisition process) and a data-encoded beam (e.g., during a data transmission process), where the wavelength(s) of the data-encoded beam is different than the wavelength(s) of the beacon beam. The optics direct the optical beams along a same optical path and in a direction towards a remote FSO communication terminal. A wavelength dependence (e.g., due to the chromatic design) of the optics results in a divergence of the optical beams that depends on the wavelength of the optical beams. The wavelengths of the beams may be selected such that the divergence of the beacon beam is larger than the divergence of the data-encoded beam. A controller may control the wavelength of the optical beacon beam produced by the optical source, thereby adjusting the divergence of the optical beacon beam (e.g., according to a beam acquisition process or a beam tracking process). For example, beam wavelength may be controlled by tuning a single laser source, by switching between a plurality of sources operating on different wavelengths, or by some combination of these methods.

Adjusting the beam divergence of beams can decrease the time of a beam acquisition process (e.g., acquisition time depends on (beam divergence)$^2$). Because less time is spent to establish a communication link between two FSO communication terminals, more time can be spent transferring data between the terminals during a data transmission process. Furthermore, the divergence may be adjusted without any mechanical motion, such as moving the optics relative to the rest of the terminal. This may reduce system complexity and may increase the operational lifetime of the terminal.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIGS. 1A and 1B are block diagrams of two terminals communicating via FSO communication links, according to some embodiments.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FSO Communication Terminals

FIGS. 1A and 1B are block diagrams of terminals 100A and 100B communicating via free space optical (FSO) communication links, according to some embodiments. Specifically, the terminals 100 are communicating by transmitting and receiving FSO beams 105. In FIG. 1A, each terminal 100 receives and transmits FSO beams 105 through different apertures, while in FIG. 1B, the terminals are co-boresighted so that beams are received and transmitted though the same aperture. As described herein, if terminal 100A is referenced, terminal 100B may be referred to as a remote terminal, beam 105A may be referred to as a transmit (Tx) beam, and beam 105B may be referred to as a receive (Rx) beam.

As illustrated, the terminals are aligned with each other. This results in the FSO beams being received by the apertures of the receiving terminals 100. Aligning FSO terminals so that they direct their beams toward each other may be referred to as beam acquisition. The optical beam used for the beam acquisition process may be referred to as a beacon. A beacon beam may also be used during other processes, such as during a beam tracking process. A beacon beam may be the same optical beam used to transmit data or it may be a separate optical beam. If the beacon is a separate optical beam, it typically will propagate through the same optics as the data-encoded signal beam. As further described below, to decrease acquisition time, terminal 100 can change the divergence of its beacon beam by changing the wavelength of the beacon optical beam.

Figure 2A:
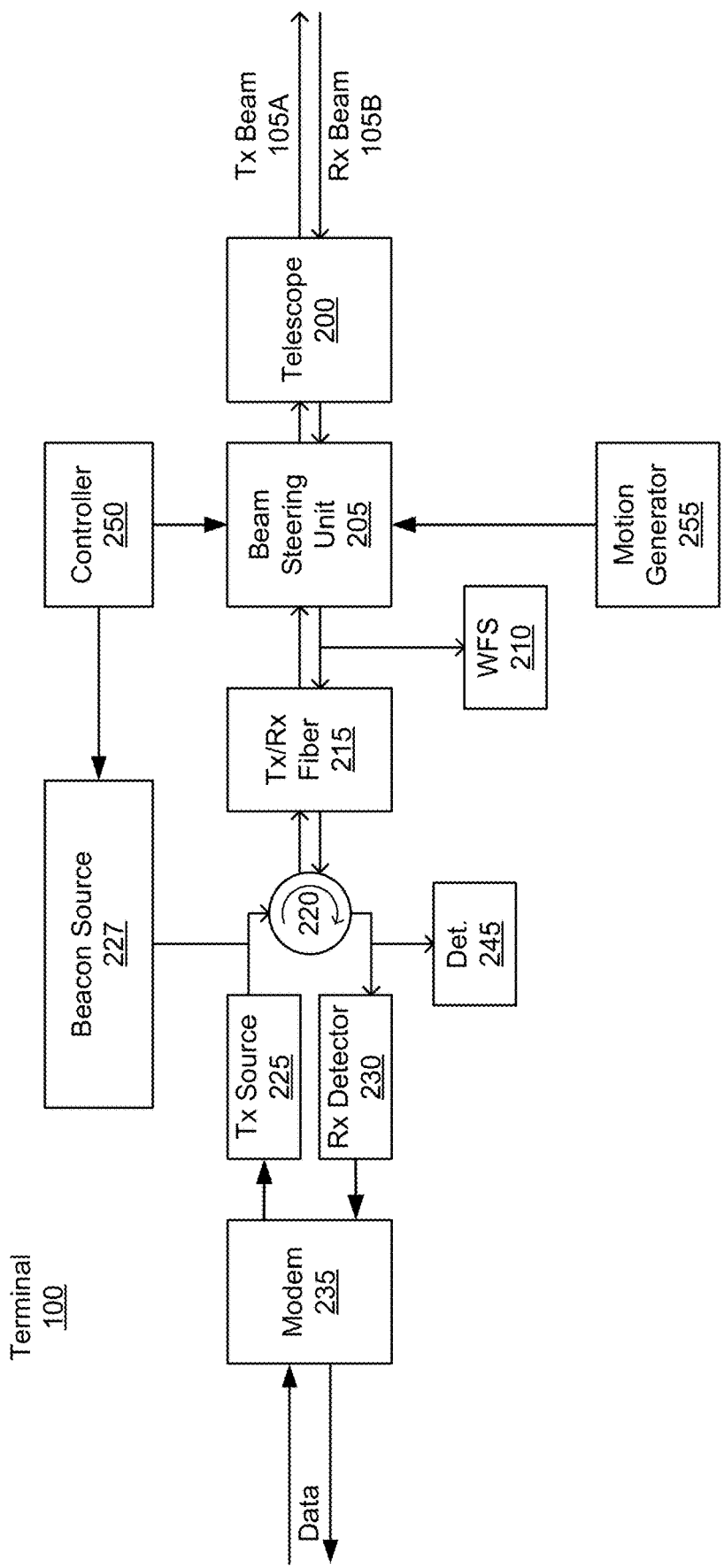
FIG. 2A is a block diagram of a single terminal, according to an embodiment.
Figure 2B:
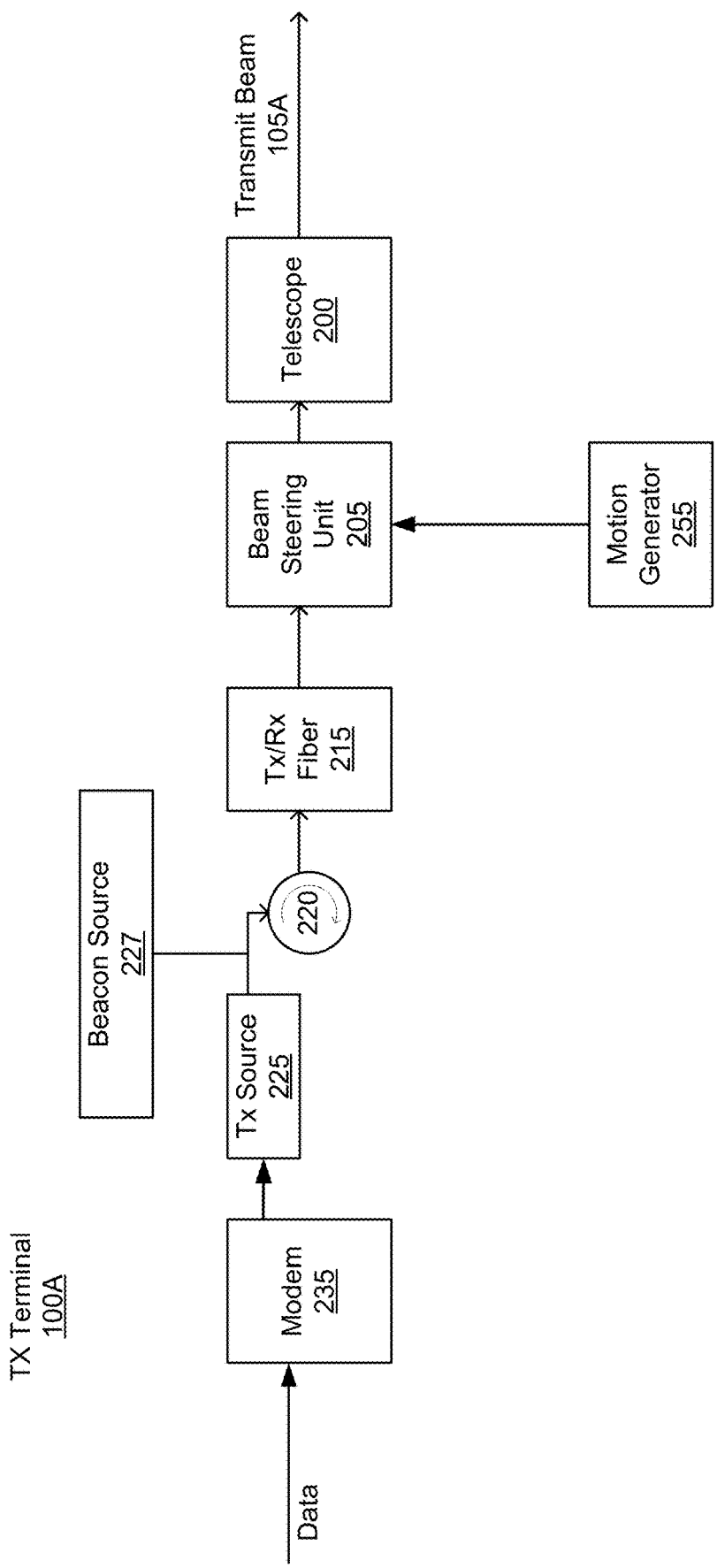
FIGS. 2B-2C are block diagrams of a single FSO communication link, according to an embodiment.
Figure 2C:
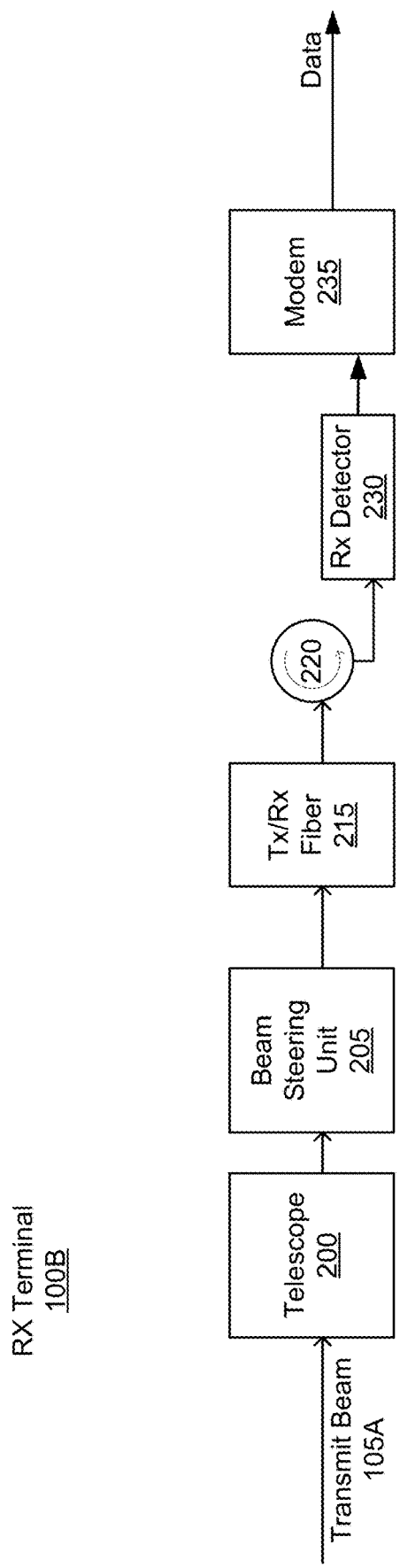

Before describing further details of the beam acquisition process and the wavelength-based control of the divergence of the beacon optical beam, FIGS. 2A-2C describe operation of the FSO terminals after they have been aligned and are now transmitting data to each other. FIG. 2A is a block diagram of a single terminal 100, according to an embodiment. The terminal 100 includes a data I/O interface (not shown), modem 235, Tx source 225, beacon source 227, Rx detector 230, a circulator 220, a Tx/Rx fiber 215, a wavefront sensor 210, a beam steering unit 205, a telescope 200, a motion generator 255, a power detector 245, and a controller 250. In FIG. 2A, electrical signals (both analog and digital) are indicated by the solid arrows and optical signals (both guided and free space) are indicated by the line arrows.

The components are optically coupled as follows. The telescope 200 is optically coupled to the beam steering unit 205. The beam steering unit 205 is optically coupled to the wavefront sensor 210. It is also optically coupled to the circulator 220 via the fiber 215. The ports of the optical circular 220 are optically coupled to the Tx source 225 and source 227 (which are combined into one port), the Tx/Rx fiber 215, and the power detector 245 and Rx detector 230 (also coupled to one port).

The components are electrically coupled as follows. The controller 250 is electrically coupled to the beam steering unit 205 and the beacon source 227. The modem 235 is electrically coupled to the Tx source 225 and the Rx detector 230. It may also receive data from the power detector 245 and wavefront sensor 210 (after conversion to digital form) and it may provide data to the controller 250. In some embodiments, the controller 250 is electrically coupled to the wavefront sensor 210, the modem 235, the motion generator 255, and/or power detector 245 (not illustrated).

FIGS. 2B and 2C illustrate one FSO communication link from a Tx terminal to a Rx terminal. Specifically, FIGS. 2B and 2C show the data path from Tx terminal 100A to Rx terminal 100B. FIG. 2B shows the data path in the Tx terminal 105A from incoming digital data to outgoing FSO transmit beam 105A. Modem 235 modulates the Tx source 225 based on the incoming data. The data-encoded light is transmitted by circulator 220, fiber 215, beam steering unit 205 to telescope 200, which directs the data-encoded FSO beam 105A to the Rx terminal 100B. FIG. 2C shows the data path at the Rx terminal 100B. Relative to the Rx terminal 100B, the incoming beam is its Rx beam, but it is labelled as transmit beam 105A in FIG. 2C to maintain consistency throughout the figures. The transmit beam 105A is optically coupled from telescope 200, to beam steering unit 205, fiber 215 and circulator 220 to the Rx detector 230. The output of the Rx detector 230 is demodulated by modem 235 to produce the outgoing digital data.

FIG. 2A shows both aspects for a single terminal. The terminal 100 includes at least two optical paths: an Rx beam path and a Tx beam path. In the Rx beam path, a Rx beam 105B propagates through the telescope 200 and is directed towards the beam steering unit 205. The beam steering unit 205 steers the Rx beam to the wavefront sensor 210. A portion of the beam is detected by the wavefront sensor 210 and another portion of the beam is coupled into the fiber 215. Light in the fiber 215 is directed by the circulator 220 to the Rx detector 230. In the Tx beam path, a Tx beam from the Tx source 225 is directed to the fiber 215 by the circulator 220. The Tx beam is emitted from the fiber 215 and towards the beam steering unit 205. The Tx beam is directed by the beam steering unit 205 towards the telescope 200. The Tx beam 105A propagates through the telescope 200 and into free space.

The telescope 200 and beam steering unit 205 are optical components that direct Rx beams to the wavefront sensor 210 and fiber 215, and direct Tx beams to the remote terminal. In some embodiments, the telescope 200 is positioned upstream of the beam steering unit 205 with respect to the Tx beam path. The telescope 200 includes components that can spread, focus, redirect, and otherwise modify the beams 105 passing through it. The position of the telescope 200 relative to the terminal 100 is typically fixed. The telescope 200 may be as simple as a single lens or it may include additional optical components, such as diffusers, phase screens, beam expanders, mirrors, and lenses. The telescope 200 is further describe with reference to FIG. 5.

Many embodiments of the beam steering unit 205 are compatible with the present invention. This can be, for example, a mechanically driven reflective or refractive device. Examples of such devices include mirrors, Fresnel devices, and lenslet arrays. The mechanical driver for any one of these examples may include voice-coil actuators, piezoelectric actuators, and servo-motor driven positioners. Additionally or alternatively, microelectronic array (MEMS) devices or opto-acoustic devices that exploit acoustic waves in reflective or refractive materials can be used.

The beam steering unit 205 may operate in different modes, such as a beam acquisition mode or a beam tracking mode. For example, an initial Tx direction can be established through a beam acquisition mode. The Tx direction may be determined or updated based on feedback signals (e.g., alignment errors), for example from the controller 250, modem 235, and the wavefront sensor 210 (this feedback path not shown in FIG. 2). In some cases, the Tx beam 105A is transmitted by the telescope 200 along the same direction as the Rx beam 105B is received (the Rx direction may be determined from the wavefront sensor 210). In some cases, the Tx direction is not parallel to the Rx direction. For example, atmospheric conditions between terminals 100 can affect beams differently depending on their propagation direction. In these cases, Tx and Rx beams may travel different optical paths between terminals 100.

While steering Tx beams in a Tx direction towards a remote terminal, the beam steering unit 205 may dither the Tx direction. The motion generator 255 can generate control signals to dither the Tx direction. The Tx direction can be dithered along one or more axes. For example, conical scans (circular and elliptical) are two-dimensional dither patterns that may be used. The amplitude of the dither may be a fraction of the Tx beam size.

The wavefront sensor 210 is a component that detects incident light. The wavefront sensor 210 includes detectors to determine the position of an incident Rx beam. For example, the wavefront sensor 210 may be a quad-cell (or other multi-cell) sensor. The detectors of the wavefront sensor 210 can be photodetectors or other electromagnetic-wave detectors that convert the incoming electromagnetic waves into electrical current. The wavefront sensor 210 can include light detectors capable of detecting different types of light signals, e.g., low and high light intensities, specific wavelengths, etc. This allows the terminal 100 to operate in low light (e.g., at night) and high light situations (e.g., at mid-day). The wavefront sensor 210 may include a hole filled by an end of the fiber 215. This can allow light directed to the wavefront sensor 210 to be coupled into the fiber 215. In another example, the wavefront sensor 210 includes a fiber bundle connected to detectors. These example wavefront sensors 210 and fiber combinations 215 are described in U.S. Pat. No. 10,389,442 "Free Space Optical (FSO) System" and U.S. Pat. No. 10,411,797 "Free Space Optical Node with Fiber Bundle" which are incorporated herein by reference in their entirety.

The Tx/Rx fiber 215 is an optical fiber, such as a multi-mode fiber (MMF), dual core fiber, or double clad fiber. If the fiber 215 is a double clad fiber, Tx beams may propagate through the core while Rx beams propagate through the inner cladding. The circulator 220 can be a single-mode or multi-mode circulator. Example circulators are described in patent application Ser. No. 16/259,899 "Optical Circulator with Double-Clad Fiber" which is incorporated herein by reference in its entirety. The Rx detector 230 is a photodetector that converts Rx beams from the circulator 220 into electrical signals. For example, the Rx detector 230 is an avalanche photodiode (APD). The Tx source 225 converts transmit data from the modem 235 into Tx beams. The Tx source 225 can include a laser.

The power detector 245 determines power levels of an Rx beam received by the terminal 100. The power detector 245 can determine the power levels of an Rx beam coupled into the fiber 215 (referred to as the received signal strength indicator (RSSI) signal). In some embodiments, the power detector 245 is integrated into the Rx detector 230. This is one measure of the power of the incoming beam. Another measure is the power of the Rx beam incident on the wavefront sensor 210 (referred to as the $P_{QC}$ signal). The $P_{QC}$ signal may be determined by summing the power received by each of the detectors of the wavefront sensor 210. For example, if the wavefront sensor 210 is a quad cell, the signal strength from the four detectors are added together. In another example, if the wavefront sensor 210 includes a fiber bundle, the signals detected in each of the fibers are summed. To determine the RSSI signal, an optical tap or an optic splitter may be used to sample a portion of light or direct a portion of light in the fiber 215 (or the fiber to the Rx detector 230, as shown in FIG. 2) to the power detector 245. An avalanche photodiode (ADP) and an analogue to digital converter (ADC) may be used to determine the amount of light coupled into the fiber 215. Since less light may be coupled into the fiber 215 compared to the amount of light incident on the wavefront sensor 210, the $P_{QC}$ signal may be a better indicator of received power than the RSSI signal. After the $P_{QC}$ signal and the RSSI signal are determined, the signals may be transmitted to the controller 250 and/or the modem 235 (not illustrated). Note that the term "power" as used herein is used for simplicity. In some embodiments, the determined power levels are the light energy received over time (e.g., the radiant flux). In other embodiments, the determined power levels are indicators of the received power, such as signals that represent, are proportional to, or approximate to the power received by the terminal 100.

The modem 235 modulates data to be transmitted in Tx beams. Specifically, the modem 235 converts incoming data from the I/O interface 240 into a modulated electrical signal. The modulated signal is sent to the Tx source 225 and converted into a Tx beam. The modem 235 can also demodulate data encoded in Rx beams. Specifically, the modem 235 decodes information in the electrical signals from the Rx detector 230. The remaining decoded information may be transmitted to I/O interface (e.g., to be transmitted to another terminal). The modem 235 can include any electronics and/or computer instructions that modulate or demodulate signals, including physical (PHY) layer or medium access control (MAC) related processes (such as error correction).

The beacon source 227 is an optical source (such as a laser) that can produce Tx optical beams 105. If the beacon source 227 and the Tx source 225 are separate components, the beacon source 227 may share a port of the circulator 220 with the Tx source 225 so that beams from the beacon source 227 are also directed by the fiber 215, beam steering unit 205 and telescope 200. In some embodiments, beams from the beacon source 227 have a fixed wavelength. In other embodiments, the beacon source 227 can produce optical beams at different wavelengths. For example, the beacon source 227 can produce an optical beam with a wavelength in the range of 1540-1570 nanometers. Examples of beacon sources include wavelength tunable sources and switchable sources. A tunable source can vary a wavelength of a beam within a continuous range. A switchable source can produce a beam at one or more discrete wavelengths. One example of a switchable source includes different beam sources and a combiner. Each beam source can produce a beam at a different wavelength. Thus, the wavelength of the beam from the switchable source can change by switching which beam source is coupled to the rest of the optical system. The beacon source 227 may produce beams at specific wavelengths responsive to instructions from the controller 250.

The wavelength of beacon beams may be predetermined prior to FSO terminal operation and may be approximately constant during FSO terminal operation. For example, the wavelength of a beacon beam is set during an FSO terminal manufacturing process, installation process (e.g., based on the distance of a remote terminal), calibration process, etc. In other embodiments, beacon beam wavelengths dynamically change during operation of the FSO terminal. For example, the controller 250 dynamically controls the beacon source 227 based on input from one or more detectors, such as the wavefront sensor 210 and power detector 245.

Optical beams 105 from the beacon source 227 may be used as beacon beams during a beam acquisition process to establish an FSO communication link and also during a tracking mode to maintain the FSO communication link. As a result, beacon beams typically have larger divergences than data-encoded beams from the Tx source 225. For example, the divergence of beacon beams may be two to four times larger than the divergence of the data-encoded beams (however larger and smaller ratios are also possible). Beam divergence is a measure of the increase in a beam's diameter or radius with distance. In some embodiments, the beacon source 227 and the Tx source 225 are a single component. That is, for example, the optical beam produced by the single source 227/225 is used both as a beacon beam during the beam acquisition process and as the data-encoded beam during data transmission.

The controller 250 receives information (e.g., from the power detector 245, the wavefront sensor 210, and the modem 235) to determine alignment errors between the terminal 100A and the remote terminal 100B. The controller 250 provides instructions to the beam steering unit 205 to reduce the alignment errors. The controller 205 also controls the beacon source 227. The optic (e.g., telescope 200) is designed so that it changes the divergence of the optical beam 205 based on its wavelength. When the controller 205 adjusts the wavelength of the beacon source 227, it in turn controls the divergence of the transmitted beacon beam 105A. Changing the divergence of a beam based on its wavelength is further described with reference to FIGS. 5-7.

FSO Terminal Acquisition and Tracking

To establish and maintain the FSO communication link described above, each terminal 100 must keep its Tx beam adequately pointed into the other terminal's telescope aperture while simultaneously keeping its Rx beam (arriving from the remote terminal) adequately aligned with the wavefront sensor 210 and fiber 215. To do this, the controller 250 on each terminal may maintain the optical alignment of the two beams in the FSO link using the beam steering unit 205.

To establish an FSO link, the controller 250 may perform a beam acquisition process. It is desirable to perform the acquisition process in as short a time as possible to increase the time spent transferring data during the potentially short periods of unobstructed line of sight. After a link is established (i.e., when the alignment errors are within system-dependent tolerances of the FSO communication system), the FSO terminal may transition to a data transmission process during which the terminal transmits data-encoded beams. To maintain the FSO link, the FSO terminal may perform a beam tracking process during which beacon beams are transmitted. The data transmission process and the beam tracking process may occur concurrently.

In an exemplary acquisition process, the controller 250 on each terminal uses the beam steering unit 205 to scan a solid angle of space with an extent large enough to accommodate uncertainties in location of the two terminals. The controller 250 may scan for Rx light sent from the remote terminal using one or more detectors (e.g., the wavefront sensor 210 and power detector 245) that provides a measurement of power as well as the Rx direction (e.g., wavefront tip and tilt information) of the Rx beam. Adequate detected power on a detector implies that the remote terminal is (ignoring time delay) pointing at the terminal, and, by symmetry of the co-boresighted design, that the local Tx beam is also pointing at or near the remote terminal. Additionally, since beams have Gaussian profiles and an Rx beam may overfill the aperture of the remoter terminal, if an Rx beam is perfectly aligned with the aperture, then the aperture will couple a maximum power. If the beam is misaligned with the aperture, the aperture will receive less power. Thus, the amount of received power can also indicate the alignment of the Rx beam (and thus a location of the remote terminal). After a detector measures this above-threshold level of power, the controller 250 may use the received power measurements and the detector's tip and tilt measurements to instruct the beam steering unit 205 to drive the tip and tilt errors closer to zero. These steps may be iterated multiple times (e.g., by each terminal 100).

Figure 3:
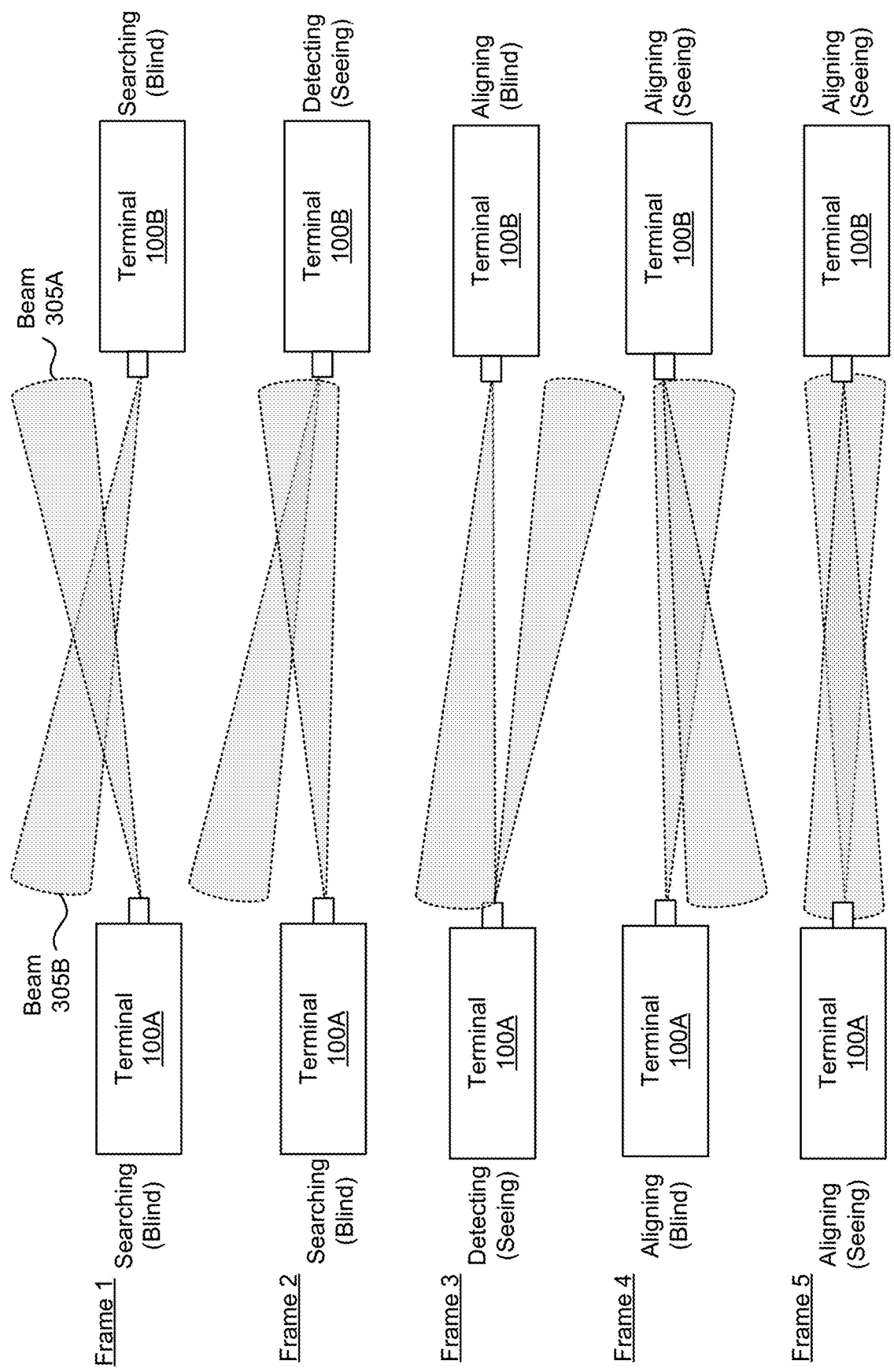
FIG. 3 illustrates an example beam acquisition process, according to an embodiment.

FIG. 3 illustrates an example acquisition process, according to an embodiment. In the top frame, the Tx direction of each terminal 100 is misaligned such that each beam is missing the other terminal and each terminal is therefore "blind" (no light seen). Both terminals scan their beams with the goal of causing the outgoing Tx beam to intersect the other terminal's Rx aperture. In the second frame, beam 305A passes by terminal 100B's Rx aperture. Terminal 100A is still blind, but terminal 100B detects the incoming light allowing terminal 100B to compute its alignment error. In the third frame, terminal 100A has continued its scan past terminal 100B, but terminal 100B (now blind again) has adjusted its Tx direction based on the light detected during the second frame, and now terminal 100A is seeing light from terminal 100B such that terminal 100A can compute its own alignment error. In the fourth frame, beam 305B has wandered off terminal 100A so terminal 100A is blind again, but terminal 100A has adjusted its Tx direction based on the light detection from the third frame, and now terminal 100B is again seeing light from terminal 100A such that terminal 100B can compute its alignment error once again. In the fifth frame, terminal 100B has adjusted its Tx direction again such that its beam 105B is seen by terminal 100A. At this point, the terminals see light from each other and may transition to a tracking mode.

Properties of the two terminals such as beam divergence and telescope aperture field of view (FOV) influence the behavior, speed, and robustness of the acquisition process illustrated in FIG. 3. For example, if both terminals have large beam divergences or large FOVs with sufficient power, then both terminals are more likely to "see" each other's Tx beacon beams and will quickly acquire with little or no scanning needed. In another example, if one terminal has a large divergence but the other terminal does not, the terminal with the large divergence may point its beam in the expected direction of the other terminal and wait for the other terminal to scan its Tx beacon beam into alignment, at which time the large divergence terminal adjusts its Tx direction into alignment with the other terminal to complete the acquisition process (e.g., with one or more iterations depending on scan and adjustment speeds). If both terminals have small FOVs or small beam divergences, both terminals may scan looking for light from the other, and this process may require a careful scan design to address the need for simultaneous alignment between the two terminals.

Figure 4B:
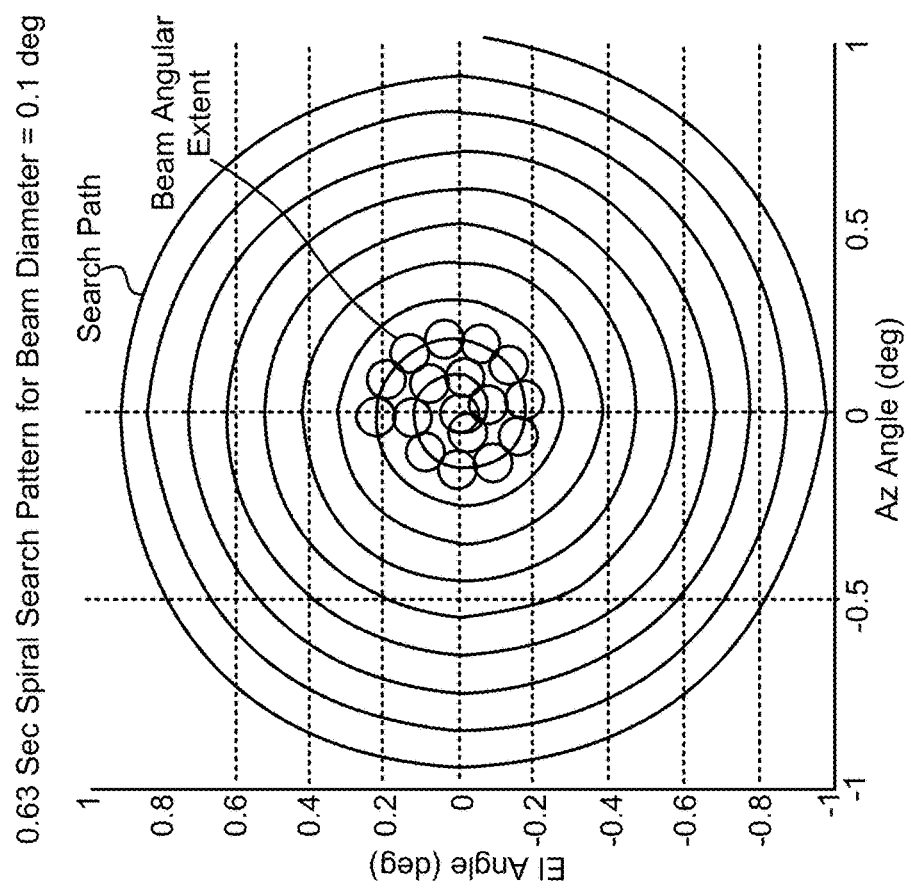
FIGS. 4A and 4B illustrate spiral search paths of a beacon beam during a beam acquisition process, according to some embodiments.
Figure 4A:
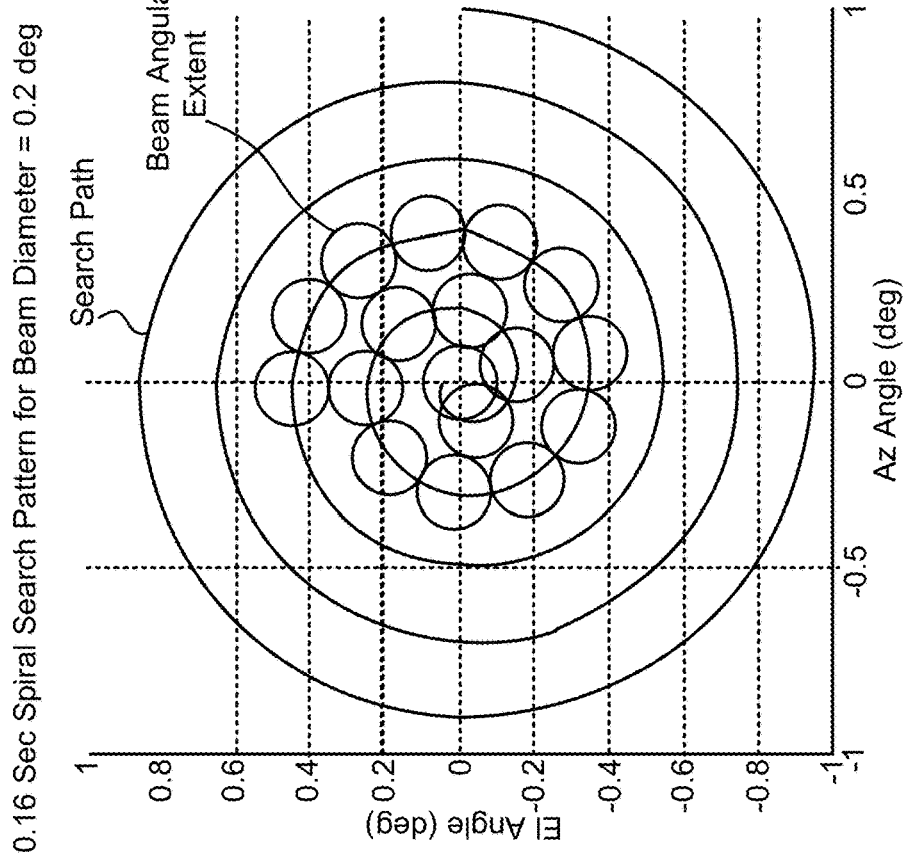

To scan a solid angle of space, a spiral path is a convenient and natural approach for FSO acquisition. FIGS. 4A and 4B illustrate two example circular spiral search paths for the same search radius of 1 degree but using beam diameters 2X different than each other. A larger beam diameter allows a spiral pattern with more widely separated orbits, which reduces the search time by 4X compared to the 2X smaller beam. If the local terminal's spiral is too rapid, the turbulence pattern may be such that the turbulence induced intensity concentrations miss the far terminal's Rx aperture as the beam spirals by, in which case the local terminal would need to spend time repeating the search once the unsuccessful search has completed. If the local terminal's spiral is slower than is needed to guarantee that the remote terminal's Rx aperture successfully sees the local terminal's Tx light, then the search time will be larger than is necessary. Although a circular spiral pattern is illustrated in FIG. 4, other scanning patterns, such as elliptical, square, etc., may be used during the acquisition process.

The exemplary acquisition approach described above with reference to FIGS. 3 and 4, may not require signaling between the FSO terminals. It can use a decoupled bilateral spiral search and Tx/Rx beacon beams that are co-boresighted with respect to the beam steering unit 205 such that actions taken by each terminal can depend only on the reception of an optical beam from the other terminal. Each terminal can react upon detection of power from the far terminal to adjust the terminal's steering elements to null the alignment errors of the co-boresighted Tx/Rx. This approach avoids the additional complexity needed for a cross-terminal signaling protocol and avoids the performance limitations related to the cross-terminal time delay. Since the time delay incurred when closing the control loop through the far terminal is avoided, the resulting closed-loop bandwidth of this locally closed tracking control system may be limited only by the bandwidths of the wavefront sensor 210 and the beam steering unit 205, and by any limitations imposed by the control law or processor. In some embodiments, the beacon beams and/or the data-encoded beams are modulated (e.g., via amplitude modulation). For example, a beacon beam and/or data-encoded beam is modulated at 40 or 50 kilohertz. This may help distinguish a beacon beam from a data-encoded beam, for example during a tracking process in which beacon beams and data-encoded beams are both transmitted (e.g., if only one of the beams are modulated or if the beams have different modulation frequencies). Additionally or alternatively, beam modulation may help discriminate from DC sunlight and other DC sources.

Adjustable Beam Divergence

The terminal 100 can adjust a divergence of its Tx beacon beams 105A (e.g., to decrease acquisition time). Description of this is made with reference to FIG. 5, which illustrates beacon beams 505A-505C with different divergences. As illustrated, beam 505A has the largest divergence, beam 505B has a smaller divergence, and beam 505C has the smallest divergence. To adjust the beam divergence, the terminal 100 includes a beacon source 227 and the telescope 200 includes optics 507 that direct the optical beam in a direction towards the remote terminal. A wavelength dependence (e.g., due to the chromatic design) of the optics 507 results in a divergence of the optical beam that depends on a wavelength of the optical beam. Said differently, the optical power of the optics 507 is dependent on a wavelength of the optical beam. For example, in refractive optics (i.e., lenses), the index of refraction of the lens material will vary with the wavelength. As a result, the optics may be designed so that the optical power introduced by the optics and the resulting beam divergence depends on the wavelength."

Figure 5:
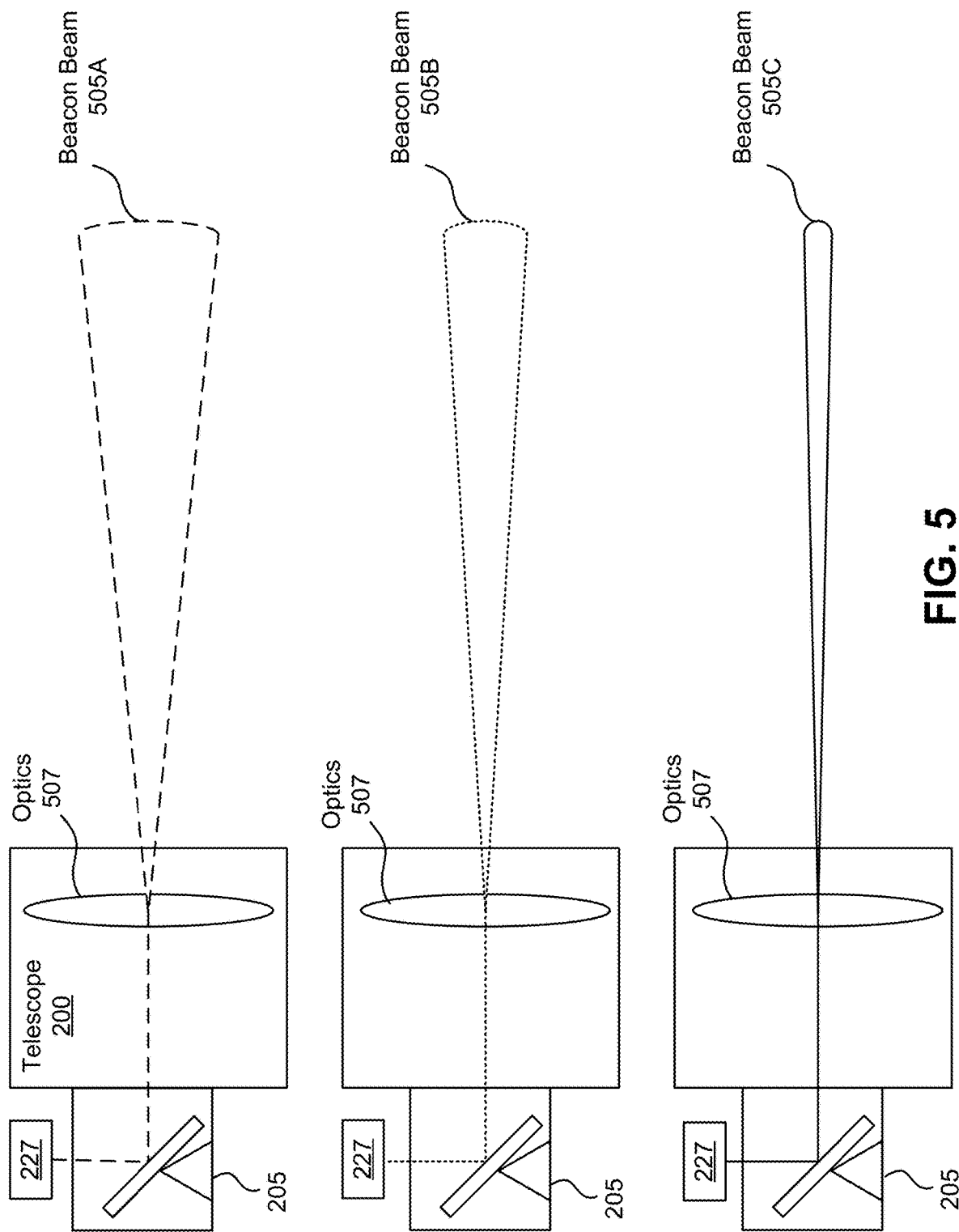
FIG. 5 illustrates beacon optical beams with different divergences, according to an embodiment.

In FIG. 5, the dashed line, dotted line, and solid line represent optical beams 505 with different wavelengths. Due to the wavelength dependence (e.g., chromatic dispersion) of the optics 507, each beam has a different divergence after passing through the optics 507. Thus, the divergence of beams can be controlled by adjusting the wavelength of the beams via the beacon source 227. Among other advantages, changes in divergence can be performed without mechanical motion, such as moving optical components in the telescope 200. This may result in reduced system complexity and may increase the operational lifetime of the terminal 100.

Optics 507 are illustrated as a single lens element in telescope 200 of FIG. 5. However, this is merely for convenience. The telescope 200 may include additional optical components than optics 507, and the optics 507 may include one or more optical components that cause the beam divergence to depend on beam wavelength. For example, the optics 507 may include one or more refractive lens elements. In some embodiments, at least 90% of the wavelength dependence of the optics 507 is contributed by a single dispersive refractive optical element. In some embodiments, not more than 50% of the wavelength dependence of the optics 507 is contributed by any single dispersive refractive optical element. If the optics 507 include multiple components, they may work in conjunction to achieve the desired wavelength dependence. In some embodiments, the optics 507 are designed to collimate beams of a specific wavelength. Beams at other wavelengths passing through the optics 507 will have divergences that are based on their wavelengths. The optics 507 may be configured such that increases in the beam wavelength increase the divergence of the beam. The remaining description will assume this relationship. However, it is not required. For example, the optics 507 are configured such that decreases in a beam wavelength increase the divergence of the beam.

Figure 6:
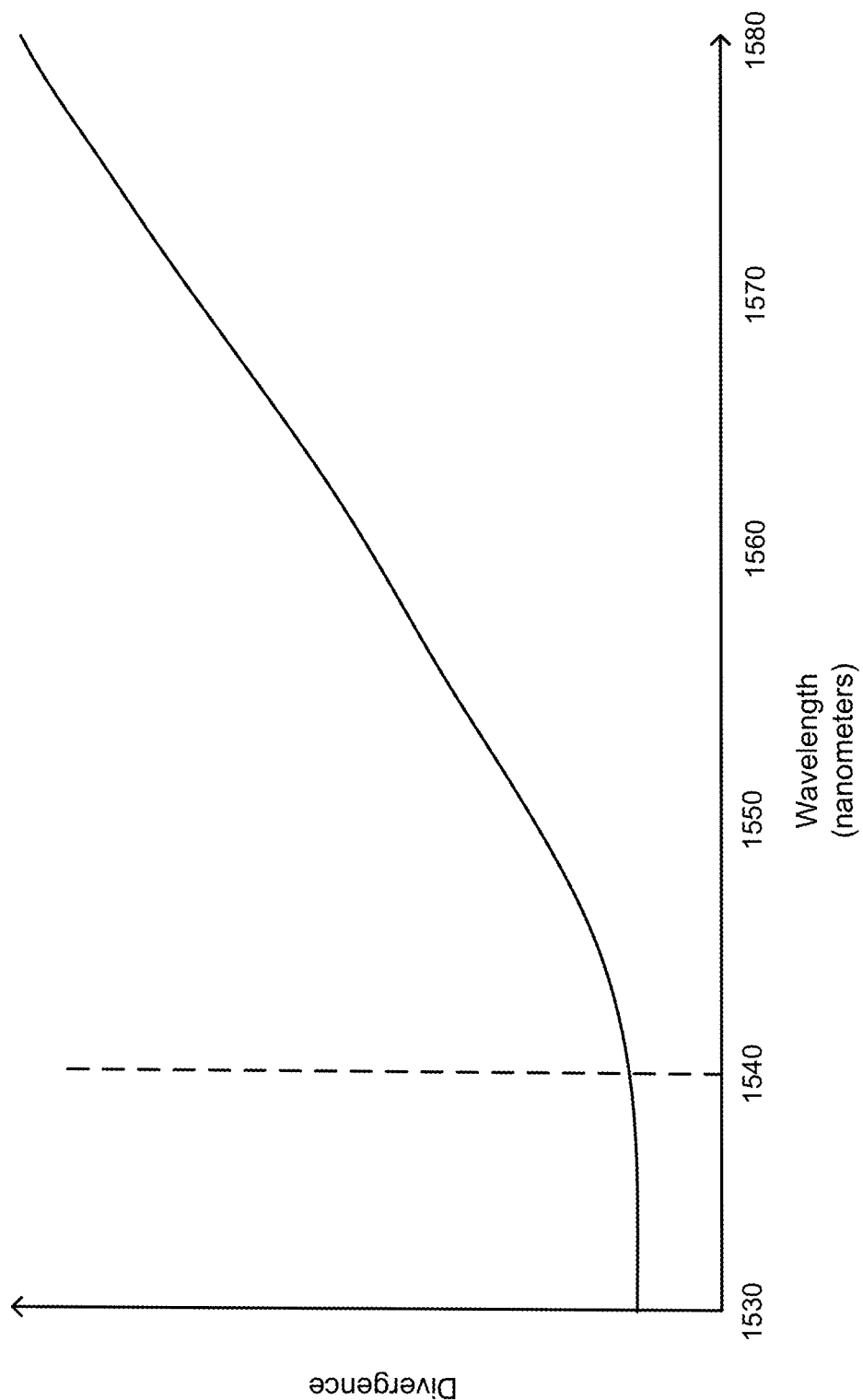
FIG. 6 plots beam divergence as a function of wavelength for the telescope optics of a terminal, according to an embodiment.

An example relationship between wavelength and divergence in optics 507 is illustrated in FIG. 6. Notice that for wavelengths below 1540 nanometers, the divergence is approximately constant. However, for wavelengths above 1540 nanometers, the divergence increases with increasing wavelength. For example, the optics are configured to provide a 4× increase in beam divergence for wavelengths between 1540 and 1570 nanometers. Thus, to change beacon beam divergences, the beacon source 227 may emit light with wavelengths above 1540 nanometers.

Typically, it is desirable for data encoded beams to have smaller divergences compared to beacon beams since they are used to transmit data while beacon beams are used to establish and maintain alignment. Since data encoded beams typically have wavelengths below 1540 nanometers (e.g., 1532 or 1536 nanometers), the optics 507 of FIG. 6 can thus direct both data encoded beams and beacon beams.

As previously described, increasing beam divergence can decrease acquisition time. Thus, during a beam acquisition process, the controller 250 may increase the wavelength of a beam to increase its divergence. However, since the power detected by the remote terminal is dependent on the divergence of the beam, the maximum divergence of a beam may be limited by the sensitivity of the remote terminal 100B. For example, if the divergence is too large, the remote terminal 100B may not detect a beacon beam from terminal 100A. Said differently, the beam power received by the remote terminal aperture may be less than a sensitivity threshold of the remote terminal detectors if the beam divergence is too large. Thus, the maximum divergence of a beam may be selected such that the beam is detectable by the remote terminal detectors. In some embodiments, if a divergence of a beam is increased, the signal strength of a beam is also increased so that the beam is detectable by the remote terminal.

Similarly, a beacon beam's divergence (and therefore wavelength) may be based on a distance between the terminals 100. In particular, since a beam's width increases as it propagates, the distance between the terminals 100 can also influence the maximum divergence (and thus wavelength) used during an acquisition process. The distance between terminals may be predetermined (e.g., during installation of the terminals). However, if a distance between terminals changes (e.g., a terminal is mounted on a moving vehicle) the beam wavelength may be dynamically adjusted to account for these distance changes. For example, if a remote terminal 100B appears to be moving away from the terminal 100A, the terminal 100A may decrease the divergence of its beacon beams to remain within the sensitivity range of the detectors on the remote terminal 100B.

Figure 7:
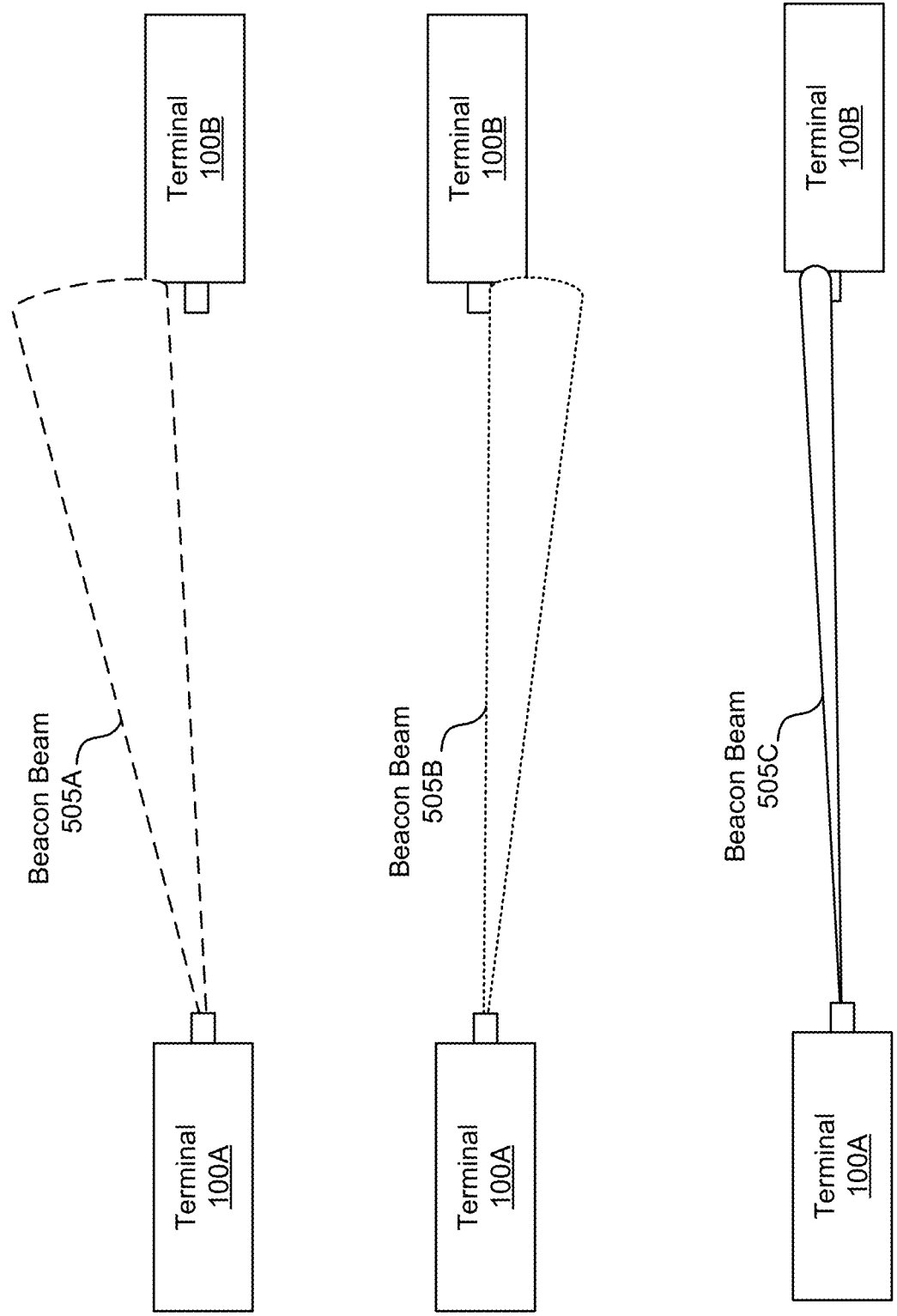
FIG. 7 illustrates an acquisition process that includes dynamically adjusting beam divergence, according to an embodiment.

FIG. 7 illustrates an example acquisition process that includes dynamically adjusting beam divergence, according to an embodiment. Note that beams from terminal 100B are omitted for simplicity. Early in the example acquisition process (e.g., when the location uncertainty of a remote terminal is high), it may be helpful to emit a beam with a large divergence (e.g., see beam 505A). This may allow the remote terminal 100B to quickly detect light from the local terminal 100A and gain an initial estimate of the terminal's location. After an initial estimate of a terminal's location is determined, the beam divergence may be reduced as the location estimate increases in accuracy (e.g., see beams 505B and 505C). It may be desirable to reduce a beam divergence because the receiving terminal collects a higher fraction of an already well-aligned beam's power when the beam has smaller divergence (e.g., as in beam 505C). This in turn reduces time to further optimize alignment.

The relative benefit of higher or lower beam divergence depends in a complex way on the communication situation. In some embodiments and application scenarios, the controller 250 may increase a beam divergence of a beacon beam to expand the range of angles over which another terminal can successfully acquire it. In other embodiments or application scenarios, the controller 250 may decrease a beam divergence to increase the distance over which another terminal can successfully acquire it, at the expense of angular range over which the other terminal can acquire the beacon. Making beam divergence adjustable enables the controller 250 to select either mode based on expectations for the angular and range position of the other terminal.

During an acquisition or tracking process, the wavelength of a beam (and thus the divergence) may be dynamically adjusted based on a location uncertainty of the remote terminal 100B. For example, as location uncertainty decreases, the beam divergence decreases and vice versa. This may increase the likelihood of beacon beams being received by the remote terminal 100B. For example, if a remote terminal 100B appears to be moving laterally relative to the terminal (e.g., based on several Rx beams), the terminal 100A may increase the divergence of a beacon beam to increase the likelihood of the beacon beam being received by the remote terminal 100B even as it is moving.

Location uncertainty may decrease if alignment errors are small or decreasing over time. Similarly, location uncertainty may increase if alignment errors are large or increasing over time. As previously described, alignment errors may be determined based on Rx beam characteristics (e.g., power measurements or estimated Rx direction). Location uncertainty may be based on the FSO link quality. For example, a decrease in FSO link quality may indicate that the local terminal is incorrectly pointing at the remote terminal or a distance estimation between the terminals is incorrect. In some cases, location uncertainty increases if a threshold amount of time passes without the terminal receiving an Rx beam. Location uncertainty may change based on motion of the terminal. In these embodiments, the terminal may include one or more motion sensors to measure terminal movement. Location uncertainty of the remote terminal may increase if the motion sensors indicate movement of the terminal above a threshold level within a specified time period.

In some embodiments, the wavelength of a beam is adjusted (thus changing the divergence) according to a time schedule. For example, at the start of an acquisition process, the initial beam divergence is large, and the time schedule specifies that the divergence of the beam decreases (e.g., continuously or by increments) as time progresses. In these embodiments, the divergence may change independently of the actions performed by the beam steering unit 205. In other embodiments, the time schedule may be dependent on the beam steering unit 205. For example, the time schedule specifies a divergence change after the completion of each solid angle scan.

In some cases, a feedback loop is established between the terminals 100. Through the feedback loop, the remote terminal 100B may communicate characteristics of a received beam, such as detected power and/or estimated Rx direction. For example, power measurements from the power detector 245 in the remote terminal 100B are sent to the modem 235 and encoded in a beam, which is transmitted to terminal 100A. Thus, when the beam is received by terminal 100A, the power measurements may be decoded and transmitted to the controller 250. The controller 250 may then provide instructions to the beacon source 227 and/or the beam steering unit 205 based on the power measurements. For example, if the power detected by terminal 100B is above a desired threshold, the controller 250 may increase beam divergence (to decrease the received power) or continue to transmit beams at the same divergence and/or direction. If the detected power is below the desired threshold, the terminal may decrease beam divergence (to increase the received power) and/or adjust a beam Tx direction.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Note that the components and terminals illustrated and described can include any electronics and/or computer instructions that may be embodied in digital or analog circuits. This may be implemented using any one or more of Application Specific Integrated Circuits (ASICs), field-programmable gate arrays (FPGAs), and general-purpose computing circuits, along with corresponding memories and computer program instructions for carrying out the described operations. The specifics of these components are not shown for clarity and compactness of description.

Depending on the form of the components, the "coupling" between components may take different forms. For example, dedicated circuitry can be coupled to each other by hard-wiring or by accessing a common register or memory location, for example. Software "coupling" can occur by any number of ways to pass information between software components (or between software and hardware, if that is the case). The term "coupling" is meant to include these examples and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A free space optical (FSO) communication terminal comprising:
an optical source that produces an optical beacon beam with a first wavelength and an optical data-encoded beam with a second wavelength, wherein the second wavelength is different than the first wavelength; and
optics that direct both the beacon beam and the data-encoded beam in a direction towards a remote FSO communication terminal, wherein the optics have a wavelength dependence that results in the beacon beam with the first wavelength having a larger divergence than the data-encoded beam with the second wavelength.

2. The FSO communication terminal of claim 1, wherein the optical source produces the optical beam with the first wavelength during a beam acquisition process and produces the optical data-encoded beam with the second wavelength during a data transmission process.

3. The FSO communication terminal of claim 2, wherein the optical source further produces a second optical beacon beam with a third wavelength concurrently with the data transmission process and a divergence of the second beacon beam with the third wavelength is larger than the divergence of the data-encoded beam with the second wavelength.

4. The FSO communication terminal of claim 3, wherein the optical source modulates at least one of the optical beacon beams.

5. The FSO communication terminal of claim 1, wherein the divergence of the beacon beam is at least 2 times larger than the divergence of the data-encoded beam.

6. The FSO communication terminal of claim 1, wherein the first wavelength is predetermined prior to operation of the FSO terminal.

7. The FSO communication terminal of claim 1, wherein the optical source includes a Tx source that produces the data-encoded beam and a separate beacon source that produces the beacon beam.

8. The FSO communication terminal of claim 7, wherein the beacon beam source is a wavelength-tunable source or a wavelength-switchable source.

9. The FSO communication terminal of claim 7, wherein the beacon beam source is a fixed wavelength source.

10. The FSO communication terminal of claim 1, wherein the optical source includes a single source that produces both the data-encoded beam and the beacon beam.

11. The FSO communication terminal of claim 1, wherein the optical source is adjustable to change the first wavelength and increasing the first wavelength of the beacon beam increases the divergence of the beacon beam and decreasing the first wavelength of the beacon beam decreases the divergence of the beacon beam.

12. The FSO communication terminal of claim 2, wherein the optical source is adjustable to change the first wavelength, the first wavelength of the beacon beam is controlled to be longer than 1540 nanometers during the beam acquisition process, and increasing the first wavelength of the beacon beam for wavelengths longer than 1540 nanometers increases the divergence of the beacon beam.

13. The FSO communication terminal of claim 11, wherein the second wavelength of the data-encoded optical beam is shorter than 1540 nanometers.

14. A free space optical (FSO) communication terminal comprising:
an optical source that produces an optical beacon beam with a first wavelength and an optical data-encoded beam with a second wavelength, wherein the second wavelength is different than the first wavelength, and wherein the optical source is adjustable to change the first wavelength;
optics that direct both the beacon beam and the data-encoded beam in a direction towards a remote FSO communication terminal, wherein the optics have a wavelength dependence that results in the beacon beam with the first wavelength having a larger divergence than the data-encoded beam with the second wavelength, and wherein the optical source produces the optical beam with the first wavelength during a beam acquisition process and produces the optical data-encoded beam with the second wavelength during a data transmission process, and
a controller that controls the first wavelength of the beacon beam produced by the optical source, thereby adjusting the divergence of the beacon beam according to the beam acquisition process for a communication link between the two FSO communication terminals.

15. The FSO communication terminal of claim 14, wherein the controller is configured to control the first wavelength of the beacon beam in a direction that increases the divergence of the beacon beam responsive to an indication of increasing location uncertainty of the remote FSO communication terminal.

16. The FSO communication terminal of claim 14, further comprising a motion sensor, wherein the controller is configured to control the first wavelength of the beacon beam in a direction that increases the divergence of the beacon beam responsive to the motion sensor sensing motion that is above a threshold.

17. The FSO communication terminal of claim 14, wherein the controller controls the first wavelength of the beacon beam based on a distance between the two FSO communication terminals.

18. The FSO communication terminal of claim 14, wherein the controller controls the first wavelength of the optical beam to stay within an operating range based on a sensitivity level of a detector in the remote FSO communication terminal.

19. The FSO communication terminal of claim 1, wherein at least 90% of the wavelength dependence of the optics is contributed by a single dispersive refractive optical element.

20. The FSO communication terminal of claim 1, wherein not more than 50% of the wavelength dependence of the optics is contributed by any single dispersive refractive optical element.

* * * * *